United States Patent
Kadoma (10) Patent No.: US 9,403,199 B2
(45) Date of Patent: Aug. 2, 2016

(54) MANUFACTURE METHOD OF TUBULAR MEMBER AND TUBULAR MEMBER MANUFACTURED BY THE SAME

(71) Applicant: Yoshiaki Kadoma, Okazaki (JP)

(72) Inventor: Yoshiaki Kadoma, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 14/354,335

(22) PCT Filed: Oct. 11, 2012

(86) PCT No.: PCT/IB2012/002014
§ 371 (c)(1),
(2) Date: Apr. 25, 2014

(87) PCT Pub. No.: WO2013/061124
PCT Pub. Date: May 2, 2013

(65) Prior Publication Data
US 2014/0261840 A1 Sep. 18, 2014

(30) Foreign Application Priority Data
Oct. 27, 2011 (JP) ................. 2011-236128

(51) Int. Cl.
*B21D 41/02* (2006.01)
*B21B 23/00* (2006.01)
(Continued)

(52) U.S. Cl.
CPC ............ *B21B 23/00* (2013.01); *B21C 37/0815* (2013.01); *B21C 37/157* (2013.01); *B21D 5/015* (2013.01); *B21D 41/02* (2013.01); *F16L 9/02* (2013.01); *F16L 9/17* (2013.01); *F16L 23/032* (2013.01)

(58) Field of Classification Search
CPC ........ B21D 39/08; B21D 39/20; B21D 41/02; B21D 41/026; B21D 51/02; B21D 53/44; B21D 5/015; B21C 37/15; B21C 37/157; B21C 37/16; B21B 23/00; B01D 29/111
See application file for complete search history.

(56) References Cited

U.S. PATENT DOCUMENTS 1,450,189 A * 4/1923 Smith .......................... 279/20.1
1,945,076 A * 1/1934 Riemenschneider ......... 228/170
(Continued)

FOREIGN PATENT DOCUMENTS

| JP | S52-125460 A | 10/1977 |
|---|---|---|
| JP | S52-140460 A | 11/1977 |

(Continued)

OTHER PUBLICATIONS

Partial Translation of Dec. 17, 2014 Office Action issued in Japanese Patent Application No. JP-2011-236128.

*Primary Examiner* — Edward Tolan
(74) *Attorney, Agent, or Firm* — Oliff PLC (57) ABSTRACT

An expandable tube portion including slots arranged in a staggered fashion is expanded. When the expandable tube portion is expanded, the individual slots open to a cut end portion of the expandable tube portion are transformed to open in V-shape while the whole body of the expandable tube portion is transformed to a lattice configuration. Hence, the tube expansion only need to apply a working force required to bend intersections of the lattice configuration, resulting in the reduction of the working force for tube expansion. As a result, the working force for tube expansion does not open a butt connection portion of a subject matter, negating the need for previously weld bonding the butt connection portion of the subject matter.

5 Claims, 8 Drawing Sheets (51) Int. Cl.
  *B21C 37/08* (2006.01)
  *B21D 5/01* (2006.01)
  *F16L 9/17* (2006.01)
  *B21C 37/15* (2006.01)
  *F16L 9/02* (2006.01)
  *F16L 23/032* (2006.01)

(56) References Cited

U.S. PATENT DOCUMENTS

| | | | | |
|---|---|---|---|---|
| 4,621,421 | A | * | 11/1986 | O'Loughlin .................. 29/874 |
| 5,095,597 | A | * | 3/1992 | Alhamad ................ A62C 3/06 |
| | | | | 29/6.1 |
| 5,163,226 | A | * | 11/1992 | Phelps ...................... 29/897.2 |
| 8,578,577 | B2 | * | 11/2013 | Castricum ............ B01D 29/111 |
| | | | | 29/33 Q |
| 2004/0098128 | A1 | | 5/2004 | Biedermann et al. |
| 2010/0131045 | A1 | * | 5/2010 | Globerman et al. ......... 623/1.16 |
| 2013/0067907 | A1 | * | 3/2013 | Greene et al. ................... 60/527 |
| 2013/0096554 | A1 | * | 4/2013 | Groff et al. ..................... 606/41 |
| 2013/0096669 | A1 | * | 4/2013 | Bregulla et al. .............. 623/1.16 |

FOREIGN PATENT DOCUMENTS

| | | |
|---|---|---|
| JP | H11-147147 A | 6/1999 |
| JP | A-11-179453 | 7/1999 |
| JP | 2004-073864 A | 3/2004 |

* cited by examiner

MANUFACTURE METHOD OF TUBULAR MEMBER AND TUBULAR MEMBER MANUFACTURED BY THE SAME

BACKGROUND OF THE INVENTION

1. Field of the Invention

The present invention relates to a manufacture method of tubular member and the tubular member manufactured by this method. Particularly, the invention relates to a manufacture method of tubular member having a tube expansion portion and the tubular member manufactured by the method.

2. Description of Related Art

A tubular member having a tube expansion portion at one end thereof (see, for example, Japanese Patent Application Publication No. 11-179453 (JP 11-179453 A)) can be manufactured by a method which includes, for example, a sheet rolling step to roll a flat sheet subject matter into a tubular configuration and a tube expanding step to expand the one end of the tubular subject matter. In this case, the sheet rolling step can obtain a tubular subject matter free from clearance at a butt connection by U-O bending the flat sheet subject matter using a U-bending die followed by an O-bending die. The tube expanding step may encounter a problem that the one end of the tubular subject matter is circumferentially drawn during the shape forming and the tubular subject matter is opened at the butt connection. It is therefore a conventional practice, for example, to weld bond the butt connection of the tubular subject matter formed by the sheet rolling step although it is unnecessary for the butt connection to be weld bonded to ensure a function of this part. This results in the increased number of steps which leads to reduced productivity as well as to increased manufacture costs.

SUMMARY OF THE INVENTION

In view of the above, the invention has an object to provide a manufacture method of tubular member that is adapted to reduce the working force for tube expansion to thereby eliminate the step of weld boding the butt connection portion, as well as the tubular member manufactured by the method.

According to one aspect of the invention, a method of manufacturing a tubular member having a tube expansion portion by working a sheet-like subject matter, includes: a press-cutting step of forming slots or slits at an expandable tube portion of a sheet-like subject matter; a sheet rolling step of rolling the subject matter press-cut by the press-cutting step into a tubular subject matter tightly connected at a butt connection portion thereof; and a tube expanding step of expanding the expandable tube portion of the tubular subject matter formed by the sheet rolling step.

According to the above-described manufacture method of tubular member, the tube expanding step is adapted to expand the expandable tube portion of the tubular subject matter while transforming the slots or slits formed by the press-cutting step. That is, the expanding step only need to apply a working force required for transforming the slots or slits. Therefore, the working force for tube expansion can be reduced in comparison with a case where the expandable tube portion is not formed with the slots or slits. As a result, the problem that the working force for tube expansion opens the butt connection portion of the tubular subject matter is eliminated. This negates the need for previously weld bonding the butt connection portion of the tubular subject matter. In a case where a component does not require the butt connection portion to be weld bonded to ensure the function thereof, the step of bonding the butt connection portion can be omitted.

Hence, the manufacture method can achieve the increase in productivity of the tubular member and the reduction of manufacture costs. In a case where the tubular subject matter has a cylindrical shape, the sheet rolling step can form a cylindrical subject matter free from clearance at the butt connection portion by U-O bending a flat sheet (rectangular subject matter) using, for example, U-bending die and O-bending die as existing equipment. Further, the tube expanding step can expand one end of the cylindrical subject matter by using an existing tube expanding die. That is, the implementation of such a manufacture method does not require retrofitting of the existing equipment (press machine and the like) or introduction of new equipment. The manufacture method is easy to implement and does not involve increase in facility cost. In this aspect, the above-described slot may include not only elongated holes but also circular holes. Similarly to a perforated metal sheet, the subject matter may include a plurality of holes arranged in the expandable tube portion.

In the manufacture method of tubular member, the tube expanding step may transform the slots or slits in a manner to open the slots or slits in a circumferential direction of the tubular subject matter. According to such a manufacture method of tubular member, the working force for tube expansion can be notably reduced as compared with the case where the expandable tube portion is not formed with the slots or slits because the working force (tensile force) for tube expansion is circumferentially applied to the expandable tube portion by the tube expanding step so as to transform the slots or slits in a manner to open the slots or slits in a circumferential direction of the tubular subject matter. In this case, it is desirable that the slot is an elongated hole extending in an axial direction of the tubular subject matter and that the slit is an elongated groove extending in the axial direction of the tubular subject matter. This permits the slots or slits to be opened in the circumferential direction of the tubular subject matter by applying a relatively small circumferential working force (tensile force) for tube expansion to the expandable tube portion.

In the manufacture method of tubular member, the tube expanding step may expand the expandable tube portion by changing, in two stages, the inclination angle of a step relative to an axis of the tubular subject matter, the step formed at a boundary between the expandable tube portion and the tubular subject matter exclusive of the expandable tube portion. Such a two-stage tube expansion process can form the tube expansion portion with higher precision.

In the manufacture method of tubular member, the tube expanding step may expand the expandable tube portion formed with the slots or the slits open to a cut end portion of the tubular subject matter. According to the above-described manufacture method of tubular member, the tube expanding step applies the circumferential working force (tensile force) for tube expansion to the expandable tube portion thereby transforming the slots or slits open to the cut end portion on an axially one side of the tubular subject matter in a manner that the slots or slits are opened in V-shape. Therefore, the working force for tube expansion can be effectively reduced. In this aspect of the invention, it is desirable to arrange the slots or slits circumferentially of the tubular subject matter with equal spacing.

In the manufacture method of tubular member, the press-cutting step may form the slots or slits arranged in a staggered fashion. According to the above-described manufacture method of tubular member, the expandable tube portion is transformed to a lattice configuration during tube expansion, such as an oblique lattice configuration including rhombic openings because the expandable tube portion of the subject matter includes the slots or slits in staggered arrangement. Hence, the tube expansion only need to apply a working force required to bend portions equivalent to intersections of the lattice configuration defined by the expandable tube portion. The working force for tube expansion can be more effectively reduced as compared with a normal tube expansion process in which the expandable tube portion without the slots or slits is stretched circumferentially.

In the manufacture method of tubular member, the manufacture method may further include an upsetting step of upsetting the subject matter worked by the tube expanding step by axially compressing the expandable tube portion. According to the above-described manufacture method of tubular member, the upsetting work can rigidly and tightly bond the butt connection portion of the expandable tube portion by axially compressing the expandable tube portion so expanded. Thus is improved the precision of the tubular member. Furthermore, the method can offer a tubular member with even higher precision because the upsetting work axially compresses the expandable tube portion so expanded thereby bringing respective inner sides of the above-described slots or slits opened in V-shape into end-to-end connections and more rigidly and tightly bonding the expandable tube portion. Similarly to the sheet rolling step and tube expanding step, the upsetting step can upset the expandable tube portion by using an existing upset die, negating the need for retrofitting the existing equipment (press machine and the like) or introducing new equipment. The manufacture method is easy to implement and can prevent the increase in facility cost.

Another aspect of the invention provides a tubular member formed by the above-described manufacture method, which tubular member includes: a stem portion formed in a tubular shape; a tube expansion portion formed by expanding a part of the stem portion; a first butt connection portion that extends for the full length of the tubular member; and openings defined by the slots or slits that are transformed by expanding the stem portion and are provided in the tube expansion portion and disposed at a part of the stem portion. According to the above-described tubular member, when subjected to tube expansion, a part of the stem portion (tubular subject matter) can be expanded in conjunction with the transformation of the slots or slits. That is, the tube expansion only needs to apply the working force required for transforming the slots or slits. Therefore, the working force for tube expansion can be reduced in comparison with a case where a part of the stem portion without the slots or slits is expanded. As a result, the problem that the working force for tube expansion opens the butt connection portion of the stem portion is eliminated. This negates the need for previously weld bonding the butt connection portion of the stem portion. In a case where a component does not require the butt connection portion to be weld bonded to ensure the function thereof, the step of bonding the butt connection portion (e.g., welding step) can be omitted. This results in increased productivity of the tubular member and reduced manufacture costs thereof. It is noted here that the slot may include not only elongated holes but also circular holes. Similarly to the perforated metal sheet, the tubular member may include a plurality of holes arranged in the expandable tube portion.

In the tubular member, the tube expansion portion may be formed by expanding an end of the stem portion. According to the above-described tubular member, the end of the stem portion can be expanded in conjunction with the transformation of the slots or slits. That is, the tube expansion only needs to apply the working force required for transforming the slots or slits. Therefore, the working force for tube expansion can be reduced in comparison with a case where the end of the stem portion is not formed with the slots or slits.

In the tubular member, the openings may include a plurality of first V-shaped openings circumferentially arranged in the tube expansion portion and open to a cut end portion of the tube expansion portion, and second openings disposed between the adjoining first openings of the tube expansion portion and shaped like a quadrangle as seen in an extensive form. According to the above-described tubular member, the circumferential working force (tensile force) for tube expansion is applied the end of the stem portion (tubular subject matter) whereby the slots or slits open to the cut end portion of the prior-to-expansion tubular subject matter are so transformed as to open in V-shape while the slots or slits between the adjoining slots or slits open to the cut end portion of the prior-to-expansion tubular subject matter are transformed to open in quadrangular shape as seen in the extensive form. Thus, the whole body of the tube expansion portion is transformed to the lattice configuration, e.g., the oblique lattice configuration including quadrangular openings. Hence, the tube expansion only need to apply the working force required to bend the portions equivalent to the intersections of the lattice configuration defined by the tube expansion portion. Thus, the working force for tube expansion can be more effectively reduced in comparison with the normal tube expansion process in which the stem portion without the slots or slits is stretched circumferentially. In this case, it is desirable to arrange the slots or slits circumferentially of the tube expansion portion with equal spacing.

In the tubular member, the tube expansion portion may include second butt connection portions defined by the first V-shaped openings transformed and closed in conjunction with the tubular member by being axially compressed by the upsetting work. According to the above-described tubular member, the first butt connection portion of the tube expansion portion can be rigidly and tightly bonded by the upsetting work axially compressing the tube expansion portion. Thus is improved the precision of the tubular member. Furthermore, the tubular member with even higher precision can be manufactured by axially compressing the tube expansion portion by the upsetting work to thereby transform and close the first V-shaped openings into the second butt connection portions rigidly and tightly bonded. The upsetting step can upset the stem portion by using an existing upset die, negating the need for retrofitting the existing equipment (press machine and the like) or introducing new equipment. The manufacture method is easy to implement and can eliminate the increase in facility cost.

The invention provides the manufacture method of tubular member that is adapted to reduce the working force for tube expansion so as to permit the elimination of the step of bonding the butt connection portion, as well as the tubular member manufactured by the manufacture method.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
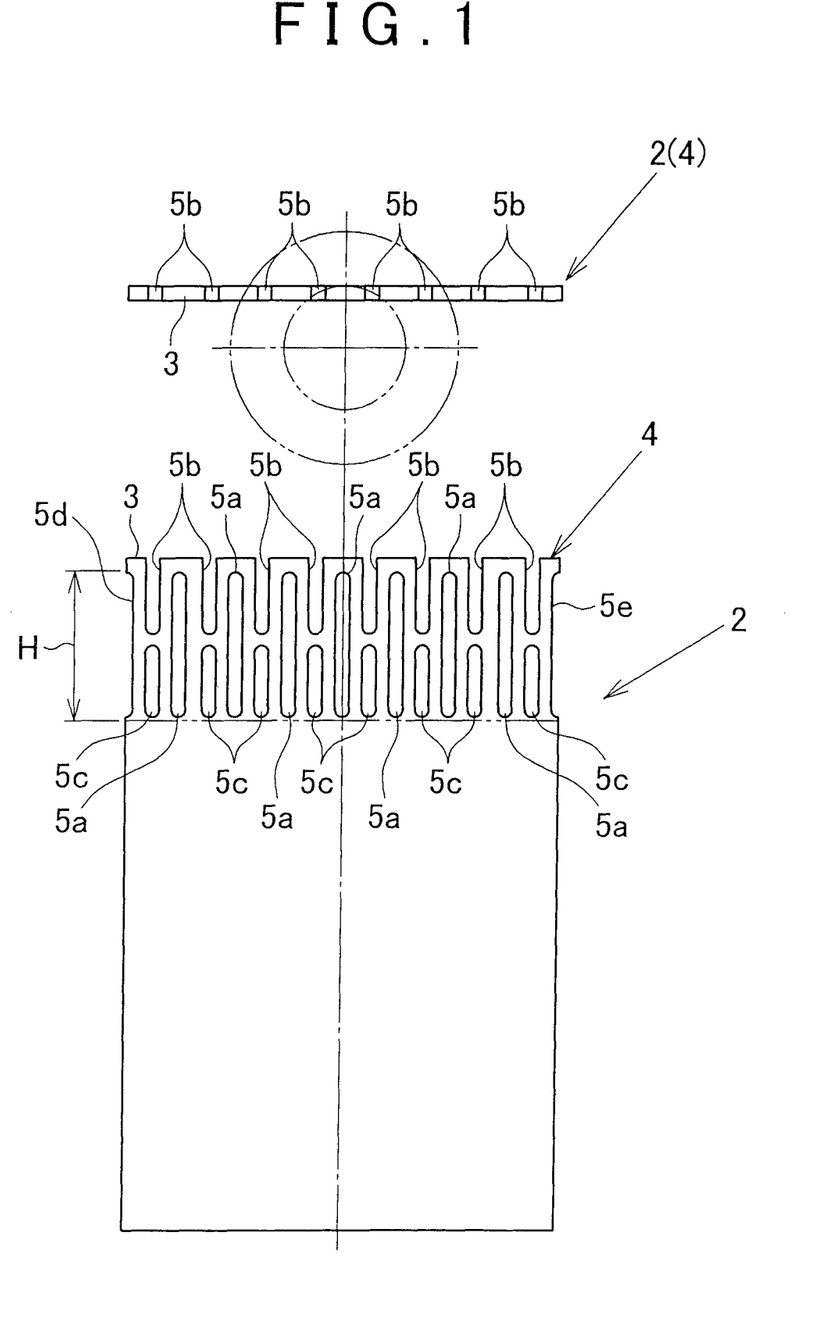
FIG. 1 includes a top plan view and a front view showing a subject matter obtained by a press-cutting step according to an embodiment of the invention.
Figure 2:
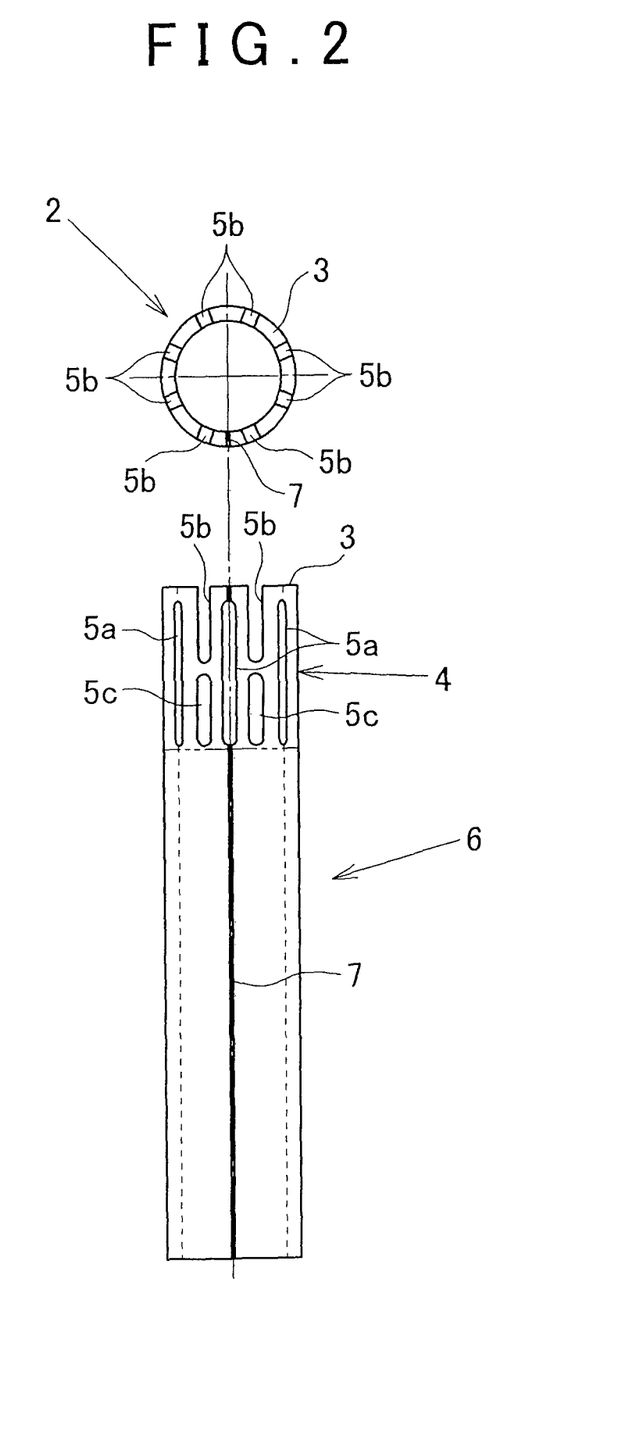
FIG. 2 includes a top plan view and a front view showing the subject matter obtained by a sheet rolling step according to the embodiment of the invention.
Figure 3:
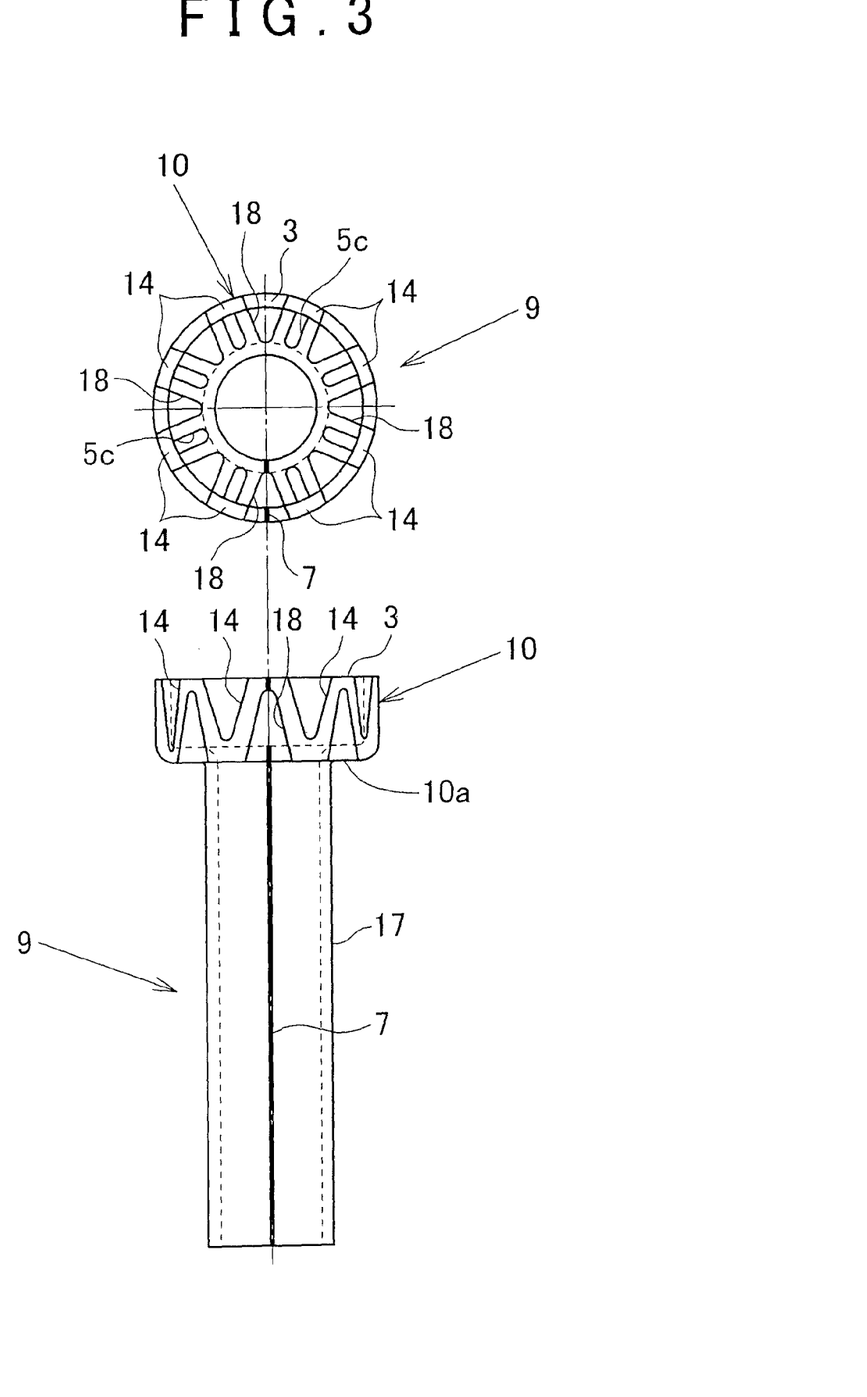
FIG. 3 includes a top plan view and a front view showing the subject matter obtained by a tube expanding step according to the embodiment of the invention.
Figure 4:
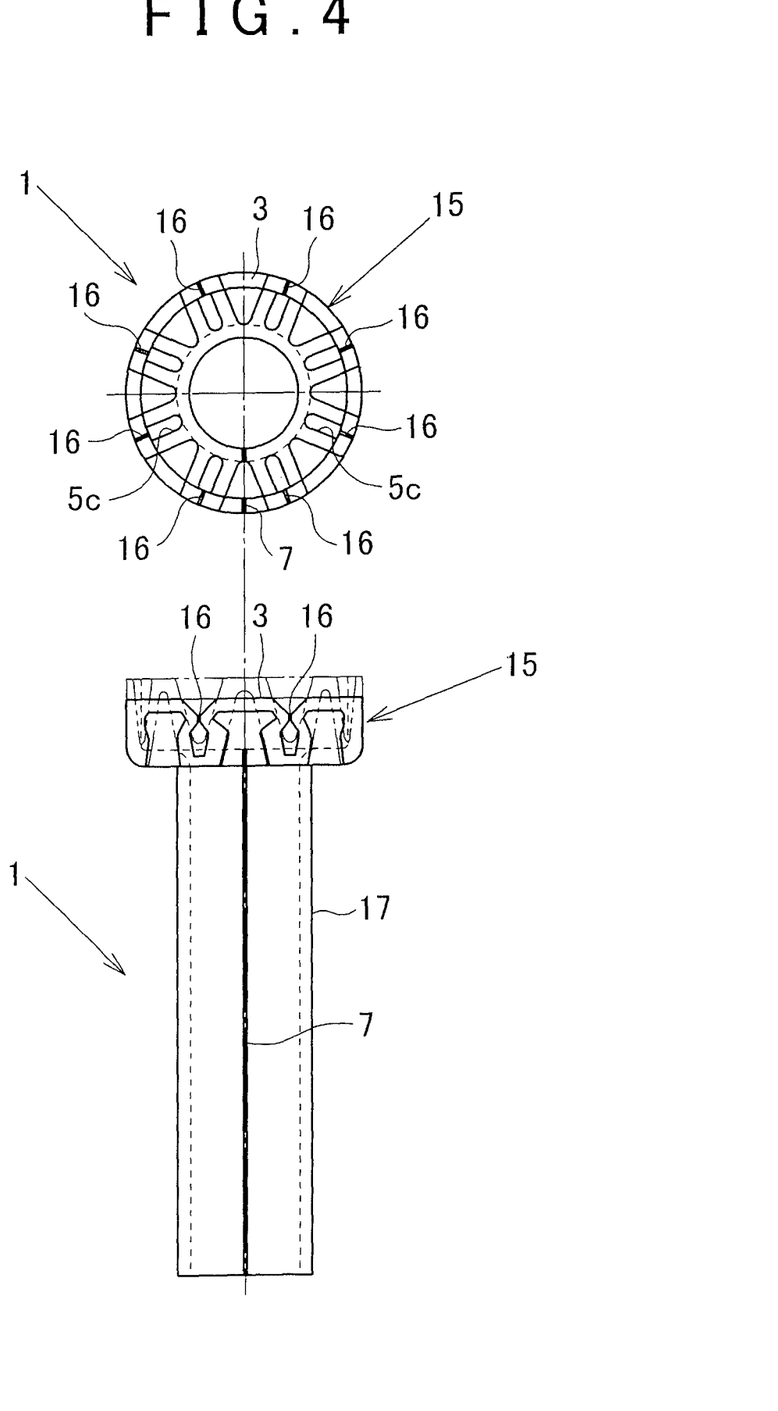
FIG. 4 includes a top plan view and a front view showing a sleeve (tubular member) obtained by an upsetting step according to the embodiment of the invention.

One embodiment of the invention is described with reference to the accompanying drawings. It is noted here that the tubular member is exemplified by a sleeve 1 (see FIG. 4) assembled in an engine and that a manufacture method of the sleeve 1 is described. For the sake of convenience, an axial direction of the sleeve 1, namely a vertical direction as seen in FIG. 4 is defined as the vertical direction. Further, a side of the sleeve 1 where a diametrical expansion portion 15 as a tube expansion portion thereof is formed is defined as the upper side and the opposite side to the diametrical expansion portion 15 is defined as the lower side. The directions in FIG. 1 to FIG. 3 are defined the same way.

The manufacture method of the invention includes: a press-cutting step, a sheet rolling step, a tube expanding step and an upsetting step. First in the press-cutting step, a press-cutting work (press work) using a press-cutting die is performed to cut out a sheet-like subject matter 2 shown in FIG. 1 from a steel sheet. Since the press-cutting die used in the press-cutting step is existing equipment, a detailed description thereof is omitted for the sake of simplicity of the present description. The subject matter 2 is formed in a substantially rectangular shape. Formed at an upper end (an upper portion as seen in FIG. 1) of the subject matter 2 is an expandable tube portion 4 that extends along an upper cut end portion 3 (cut end portion) or in a transverse direction as seen in FIG. 1 (hereinafter, referred to simply as "transverse direction").

The expandable tube portion 4 includes slots 5 (5a to 5e, elongated holes) in staggered arrangement. The slots 5 include a slot 5a extended vertically across the height 'H' of the expandable tube portion 4 (see FIG. 1) and having opposite ends formed in a semicircular shape, and a slot 5b and a slot 5c that are vertically extended and arranged in one line on the transversely opposite sides of the slot 5a. The slot 5b has an upper end that is open to the upper cut end portion 3 of the subject matter 2 and a lower end that is formed in the semicircular shape. The slot 5c is located downward of the slot 5b and has opposite ends formed in the semicircular shape. Further, the expandable tube portion 4 is formed with shaped portions 5d and 5e on transversely opposite sides thereof. The shaped portions 5d and 5e are defined by a left-half and a right-half portion of the slot 5a, respectively.

The subject matter 2 may be formed with some functionally necessary holes, the illustration of which is dispensed with. The press-cutting step performs press-cutting work on a flat subject matter before the subject matter is rolled by the sheet rolling step and hence, freedom of press-cutting method increases.

In the subsequent sheet rolling step, the subject matter 2 cut by the press-cutting step is rolled into a tubular subject mater 6 shown in FIG. 2. The sheet rolling step can form a tubular subject matter 6 free from a clearance at a butt connection portion 7 (first butt connection portion) by U-O bending (press working) the subject matter 2 using a U-bending die and an O-bending die. The slot 5d and the slot 5e at the expandable tube portion 4 of the subject matter 2 are combined together by the formation of the butt connection portion 7 so as to define the same configuration as that of the slot 5a. Since the U-bending die and the O-bending die used in the sheet rolling step are the existing equipment, a detailed description thereof is omitted for the sake of simplicity of the present description.

Figure 5:
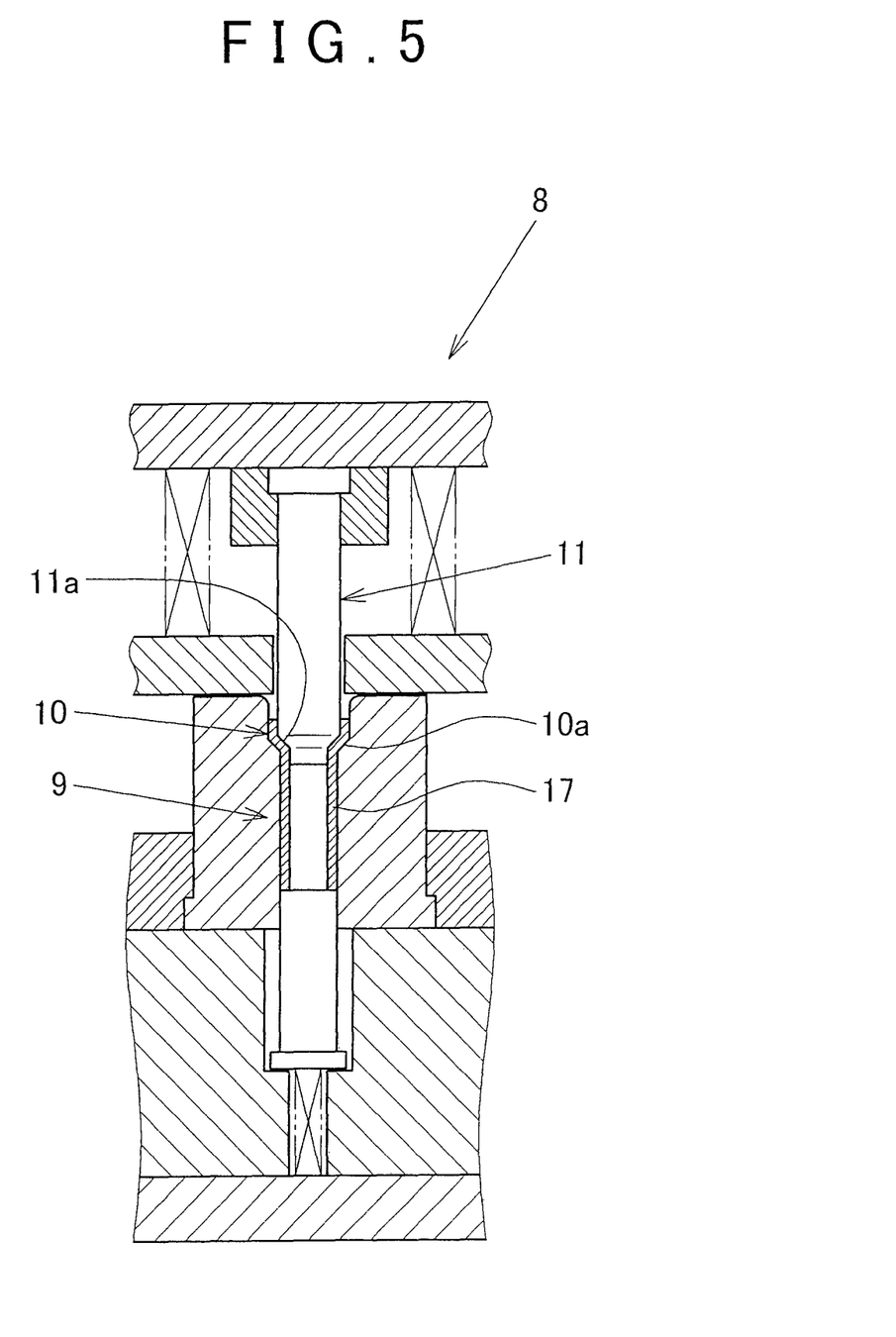
FIG. 5 is a schematic sectional view showing a tube expanding die used in the tube expanding step according to the embodiment of the invention.

In the subsequent tube expanding step, the expandable tube portion 4 of the tubular subject matter 6 formed by the sheet rolling step is subjected to tube expansion work (press work) using a tube expanding die 8 shown in FIG. 5. Since the tube expanding die 8 used in the tube expanding step is the existing equipment, a detailed description thereof is omitted for the sake of simplicity of the present description. To form a tube expansion portion 10 of a subject matter 9 which includes a step 10a having an inclination angle of 90° relative to the axis as shown in FIG. 3, the tube expanding step is performed in two stages. In a first stage, the expandable tube portion 4 of the tubular subject matter 6 is expanded by using a punch 11 including a step 11a having an intermediate inclination angle relative to the axis of a step 10a, as shown in FIG. 5, thereby forming the tube expansion portion 10 including the step 10a having the intermediate inclination angle relative to the axis. In the subsequent stage, the expandable tube portion 10 including the step 10a having the intermediate inclination angle relative to the axis is further expanded by using the punch 11 including the step 11a having the inclination angle of 90° relative to the axis. Thus, the tube expansion portion 10 including the step 10a having the inclination angle of 90° relative to the axis can be formed by performing the tube expanding step in two stages. In the tube expanding step, it is desirable to retain a stem portion 17 of the subject matter 6 in a retaining device in order not to allow the butt connection portion 7 to open during the tube expanding step.

Figure 6:
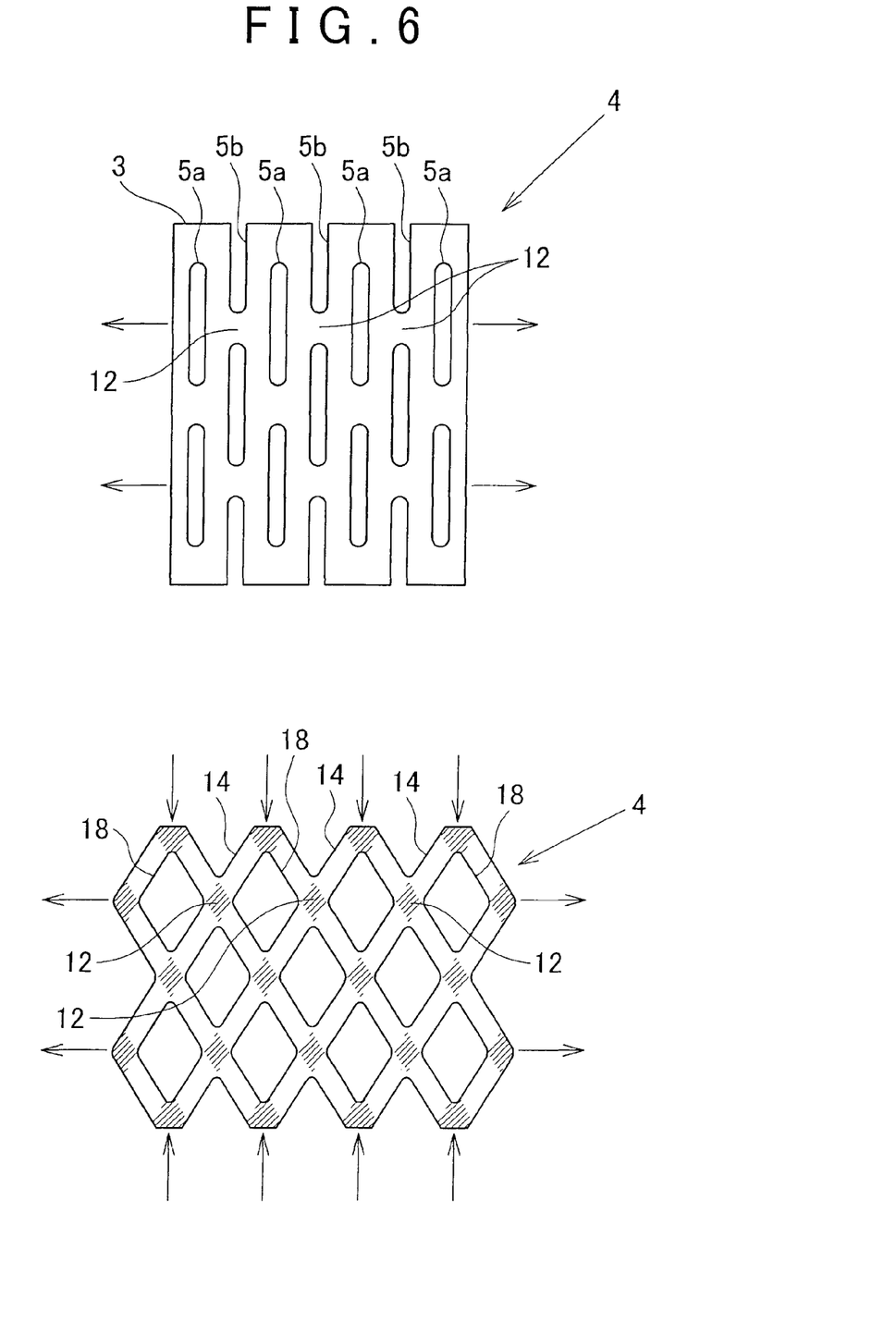
FIG. 6 is a group of diagrams for illustrating an action of the embodiment, showing how an expandable tube portion formed with slots in staggered arrangement is transformed to a lattice configuration by the tube expansion.

In the tube expanding step, the expandable tube portion 4 of the tubular subject matter 6 is subjected to a circumferential working force (tensile force) when expanded. If the tubular expandable tube portion 4 is converted to a two-dimensional extensive form, the individual slots 5b open to the upper cut end portion 3 of the subject matter 6 are transformed to open in V-shape while the expandable tube portion 4 as a whole is transformed to a lattice configuration, e.g., an oblique lattice configuration including rhombic (quadrangular) openings 18 (second openings) because the expandable tube portion 4 includes the slots 5 in staggered arrangement as shown in FIG. 6. In this case, the tube expansion only need to apply a working force required to bend portions equivalent to intersections 12 of the lattice configuration shown in FIG. 6. It is noted that FIG. 6 is the illustration for facilitating the understanding of the invention and hence, does not correspond to an arrangement pattern of the slots 5 shown in FIG. 1. In an actual three-dimensional tube expansion work, the slots 5c are scarcely transformed (scarcely opened).

Figure 7:
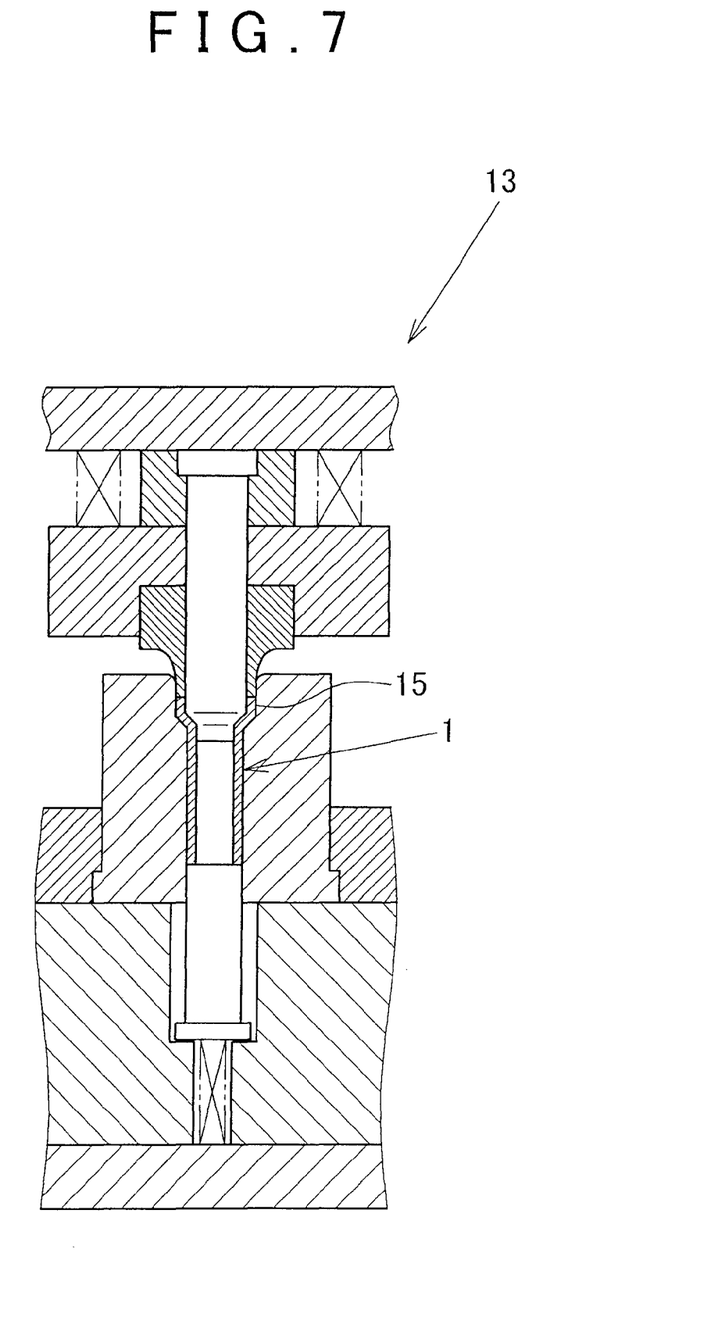
FIG. 7 is a schematic sectional view showing an upset die used in an upsetting step according to the embodiment.

In the subsequent upsetting step, the tube expansion portion 10 of the subject matter 9 formed by the tube expanding step is subjected to upset work (press work) using an upset die 13 shown in FIG. 7. Since the upset die 13 used in the upsetting step is the existing equipment, a detailed description thereof is omitted for the sake of simplicity of the present description. The upsetting step compresses the tube expansion portion 10 of the subject matter 9 in the vertical direction (the axial direction). This causes the individual V-shaped openings 14 (first openings) of the tube expansion portion 10 formed by the transformation of the slots 5b of the subject matter 2, 6 to be transformed in a manner to close the cut end portion 3 so that the respective inner sides of the openings are brought into end-to-end connections, as shown in FIG. 4. Thus is formed the sleeve 1 (tubular member) including a plurality of butt connection portions 16 (second butt connection portions) at the diametrical expansion portion 15.

This embodiment offers the following effects. According to the embodiment, the expandable tube portion 4 with the slots 5 arranged in the staggered fashion is expanded and hence, the individual slots 5b open to the cut end portion 3 of the expandable tube portion 4 are transformed to open in the V-shape while the whole body of the expandable tube portion 4 is transformed to the lattice configuration. Thus, the tube expansion only need to apply a working force required to bend the portions equivalent to the intersections 12 of the lattice configuration defined by the expandable tube portion 4. Hence, the working force for tube expansion can be more effectively reduced in comparison with the normal tube expansion process in which the expandable tube portion 4 of the subject matter 6 without the slots 5 is stretched circumferentially. As a result, the working force for tube expansion does not open the butt connection portion 7 of the subject matter 6 (9), negating the need for previously weld bonding the butt connection portion 7 of the subject matter 6. Therefore, in the case of a component, such as the sleeve 1 (tubular member) of the embodiment, that does not require the butt connection portion 7 to be weld bonded to ensure the function thereof, the step of bonding the butt connection portion 7 can be omitted. The manufacture method of the embodiment can achieve the increase in productivity and the reduction of manufacture costs.

In the upsetting step, the tube expansion portion 10 of the subject matter 9 expanded by the tube expanding step is upset whereby the individual V-shaped openings 14 (first openings) of the tube expansion portion 10 are transformed (compressed) to form the diametrical expansion portion 15 including a plurality of butt connection portions 16 (second butt connection portions). Thus is formed the sleeve 1 (tubular member) having higher precisions by virtue of the rigidly and tightly connected butt connections 16.

The press-cutting step, sheet rolling step, tube expanding step and upsetting step can be accomplished by press operations of a general-purpose press machine and hence, the manufacture method of the invention is easy to implement and permits the construction of a system featuring high productive efficiency. Further, the press-cutting step permits the whole cut configuration including the slots 5 to be cut out from the flat subject matter (steel sheet). Hence, the manufacture method can adopt a press-cutting process negating the need for post-processing such as burring.

Figure 8:
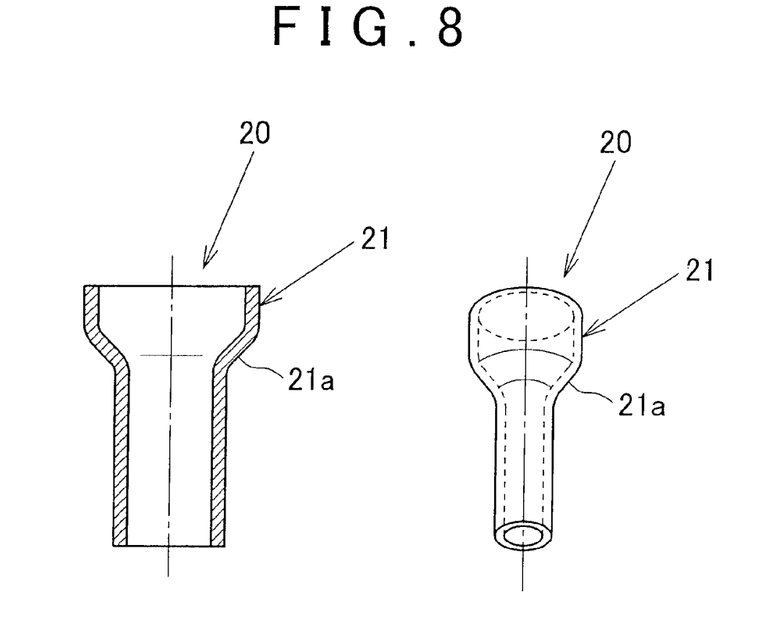
FIG. 8 is a group of diagrams showing another mode of the tubular member.
Figure 9:
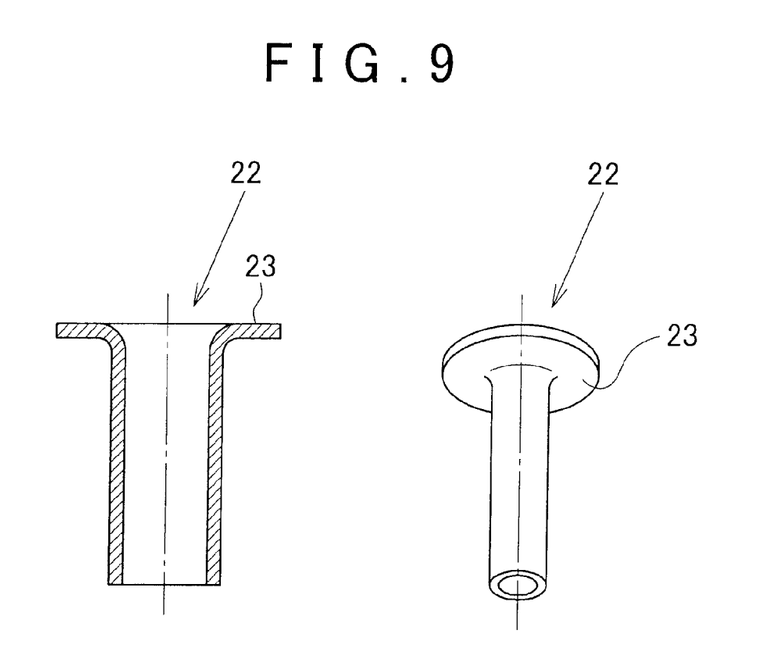
FIG. 9 is a group of diagrams showing another mode of the tubular member.

It is to be noted that the embodiment is not limited to above and may be constituted as follows. According to the embodiment, the expandable tube portion 4 includes the slots 5 arranged in the staggered fashion. Alternatively, the slots 5 (elongated holes) may be replaced by slits (elongated grooves). Further, the slots 5 may also include circular holes. In this case, the expandable tube portion 4 may include the circular holes arranged in a similar manner to a perforated metal sheet. If the working force for tube expansion is reduced, the slots 5 need not necessarily be arranged in the staggered fashion. In this embodiment, the step 10a having the inclination angle of 90° is formed at the tube expansion portion 10 by performing the tube expanding step in the two stages using the punch 11 including the step 11a having the intermediate inclination angle and the punch 11 including the step 11a having the inclination angle of 90°. Alternatively, the tube expanding step may use the punch 11 including to the step 11a having the intermediate inclination angle so as to form, at the tube expansion portion 10, the step 10a having the intermediate inclination angle. In the subsequent upsetting step, the step 10a of the tube expansion portion 10 may be so shaped as to have the inclination angle of 90° while the tube expansion portion 10 may be vertically compressed to form the diametrical expansion portion 15. The tubular member is not limited to the sleeve 1 shown in FIG. 4 and may also include, for example, a tubular member 20 including a tube expansion portion 21 including a step 21a having an inclination angle of other than 90° relative to the axis, as shown in FIG. 8, or a tubular member 22 including a flange 23 as shown in FIG. 9.

The invention claimed is:

1. A method of manufacturing a tubular member having a tube expansion portion by working a sheet-like subject matter, the method comprising:
   a press-cutting step of forming a plurality of slots or slits in a staggered fashion at an expandable tube portion of the sheet-like subject matter, the plurality of slots or slits including:
      at least one first slot or slit extending in a vertical direction of the expandable tube portion, the at least one first slot or slit having closed ends,
      at least one second slot or slit extending in the vertical direction of the expandable tube portion, the at least one second slot or slit having a length in the vertical direction that is less than a length of the at least one first slot or slit, the at least one second slot or slit having an open end and a closed end, and
      at least one third slot or slit disposed below the at least one second slot or slit and extending in the vertical direction of the expandable tube portion, the at least one third slot or slit having closed ends, the closed end of the at least one second slot or slit and one of the closed ends of the at least one third slot or slit overlapping the at least one first slot or slit in a horizontal direction of the expandable tube portion;
   a sheet rolling step of rolling the sheet-like subject matter press-cut by the press-cutting step into a tubular subject matter tightly connected at a butt connection portion of the tubular subject matter; and
   a tube expanding step of expanding the expandable tube portion of the tubular subject matter formed by the sheet rolling step such that the expandable tube portion forms a lattice configuration, the lattice configuration having quadrangular openings formed by the expanding of the plurality of slots or slits.

2. The method according to claim 1, wherein the tube expanding step transforms the plurality of slots or slits in a manner to open the plurality of slots or slits in a circumferential direction of the tubular subject matter.

3. The method according to claim 2, wherein the tube expanding step expands the expandable tube portion by changing, in two stages, an inclination angle of a step relative to an axis of the tubular subject matter, the step formed at a boundary between the expandable tube portion and the tubular subject matter exclusive of the expandable tube portion.

4. The method according to claim 1, wherein the tube expanding step expands the expandable tube portion formed with the plurality of slots or slits open to a cut end portion of the tubular subject matter.

5. The method according to claim 1, further comprising:
an upsetting step of upsetting the tubular subject matter worked by the tube expanding step by axially compressing the expandable tube portion.

\* \* \* \* \*